(12) United States Patent
Kim

(10) Patent No.: US 11,294,947 B2
(45) Date of Patent: *Apr. 5, 2022

(54) METHOD FOR LINE UP CONTENTS OF MEDIA EQUIPMENT, AND APPARATUS THEREOF

(71) Applicant: Samsung Electronics Co., Ltd., Suwon-si (KR)

(72) Inventor: Jong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

This patent is subject to a terminal disclaimer.

(21) Appl. No.: 16/700,337

(22) Filed: Dec. 2, 2019

(65) Prior Publication Data

US 2020/0104314 A1    Apr. 2, 2020

Related U.S. Application Data

(63) Continuation of application No. 13/895,758, filed on May 16, 2013, now Pat. No. 10,496,689.

(30) Foreign Application Priority Data

May 18, 2012    (KR) .................. 10-2012-0052829

(51) Int. Cl.
*G06F 16/54*    (2019.01)
*G06F 16/35*    (2019.01)
(Continued)

(52) U.S. Cl.
CPC ............ *G06F 16/35* (2019.01); *G06F 16/489* (2019.01); *G06F 16/54* (2019.01);
(Continued)

(58) Field of Classification Search
CPC .... G06F 3/04817; G06F 16/538; G06F 16/54; G06F 16/738; G06F 16/74; G06F 16/743; G06F 16/5866
See application file for complete search history.

(56) References Cited

U.S. PATENT DOCUMENTS 7,716,194 B2 *  5/2010  Williams .............. G06F 16/447
                                                            707/705
7,869,833 B2 *  1/2011  Kim ....................... H04M 1/56
                                                            455/566

(Continued)

FOREIGN PATENT DOCUMENTS

| CN | 102 165 444 A | 8/2011 |
| JP | 2006-153965 A | 6/2006 |
| JP | 2010-283538 A | 12/2010 |

OTHER PUBLICATIONS

Luis Perez:"iphoto 08 Basics", Jun. 29, 2006, XP055007859, Retrieved from the Internet: URL:http://fcit.usf.edu/laptop/pdf/iphoto08b.pdf [retrieved on Sep. 22, 2011].

(Continued)

*Primary Examiner* — William Spieler
(74) *Attorney, Agent, or Firm* — Jefferson IP Law, LLP

(57) ABSTRACT

A content arranging method and apparatus in a media equipment and recording medium that stores a program source associated with the method are provided. The content arranging method includes extracting time information associated with stored contents from meta data of each of the stored contents, classifying the stored contents based on the extracted time information and a time interval for arranging the stored contents, determining at least one time item corresponding to the time interval, and arranging each of the classified contents under a corresponding time item. The (Continued)

method arranges the stored contents in the media equipment based on a time so that a user readily retrieves a desired content.

30 Claims, 16 Drawing Sheets

(51) Int. Cl.
G11B 27/034 (2006.01)
G11B 27/34 (2006.01)
G06F 16/907 (2019.01)
G06F 16/48 (2019.01)
G06F 16/58 (2019.01)

(52) U.S. Cl.
CPC ........ *G06F 16/5866* (2019.01); *G06F 16/907* (2019.01); *G11B 27/034* (2013.01); *G11B 27/34* (2013.01)

(56) References Cited

U.S. PATENT DOCUMENTS

| | | | | |
|---|---|---|---|---|
| 7,970,240 | B1* | 6/2011 | Chao | G06F 3/04817 382/305 |
| 8,423,088 | B2* | 4/2013 | Ickman | G06F 7/08 455/566 |
| 9,104,695 | B1* | 8/2015 | Cervelli | G01C 21/3664 |
| 2003/0009493 | A1* | 1/2003 | Parker | G06F 16/54 715/201 |
| 2003/0046167 | A1* | 3/2003 | Wada | H04N 1/393 705/16 |
| 2005/0144096 | A1* | 6/2005 | Caramanna | G06Q 40/12 705/30 |
| 2006/0026521 | A1* | 2/2006 | Hotelling | G06F 3/0488 715/702 |
| 2007/0112809 | A1 | 5/2007 | Arrouye et al. | |
| 2008/0133697 | A1* | 6/2008 | Stewart | H04L 67/06 709/217 |
| 2009/0055763 | A1* | 2/2009 | Audet | G06F 3/0482 715/764 |
| 2009/0116812 | A1* | 5/2009 | O'Brien | G11B 27/11 386/278 |
| 2009/0172511 | A1* | 7/2009 | Decherd | G06F 16/9537 715/207 |
| 2009/0252383 | A1* | 10/2009 | Adam | G06K 9/00288 382/118 |
| 2009/0287782 | A1* | 11/2009 | Odess | G06Q 10/109 709/206 |
| 2010/0023865 | A1* | 1/2010 | Fulker | H04L 67/025 715/734 |
| 2010/0048242 | A1* | 2/2010 | Rhoads | G06F 16/50 455/556.1 |
| 2010/0169786 | A1* | 7/2010 | O'Brien | G11B 27/034 715/738 |
| 2010/0310232 | A1 | 12/2010 | Iwase et al. | |
| 2010/0315438 | A1* | 12/2010 | Horodezky | G06F 3/0481 345/661 |
| 2012/0082401 | A1 | 4/2012 | Berger et al. | |
| 2012/0210220 | A1* | 8/2012 | Pendergast | H04N 5/765 715/716 |
| 2012/0210230 | A1* | 8/2012 | Matsuda | G11B 27/034 715/723 |
| 2013/0063495 | A1* | 3/2013 | Milan | G06T 3/0012 345/666 |
| 2013/0110543 | A1* | 5/2013 | Leighow | G16H 30/20 705/3 |
| 2014/0215365 | A1* | 7/2014 | Hiraga | G06F 3/0488 715/765 |
| 2015/0338233 | A1* | 11/2015 | Cervelli | G06F 16/29 701/532 |

OTHER PUBLICATIONS

Marc Torrens et al: "Visualizing and exploring personal music libraries" Proceedings of the 5th International Conference on Music Information Retereival, Jan. 2, 2004, XP009160486.
Extended European Search Report dated Feb. 3, 2014, issued in a counterpart European application No. 13168221.3-1910 / 2665064.
Picasa Geeks; Free Weekly Article by Geeks on Tour; Finding Pictures with Two People; Jul. 28, 2015.
Can Apple Patent the Pinch? Experts Say It's Possible; https://www.wired.com/2008/02/multitouch-patents; Dec. 31, 2018.

\* cited by examiner

METHOD FOR LINE UP CONTENTS OF MEDIA EQUIPMENT, AND APPARATUS THEREOF

PRIORITY

This application is a continuation application of prior application Ser. No. 13/895,758, filed on May 16, 2013, which will be issued as U.S. Pat. No. 10,496,689 on Dec. 3, 2019, and claims the benefit under 35 U.S.C. § 119(a) of a Korean patent application filed on May 18, 2012 in the Korean Intellectual Property Office and assigned Serial No. 10-2012-0052829, the entire disclosure of which is hereby incorporated by reference.

BACKGROUND OF THE INVENTION

1. Field of the Invention

The present invention relates to a method and apparatus for arranging contents in a media equipment. More particularly, the present invention relates to a recoding medium that stores a program source associated with the method.

2. Description of the Related Art

As information communication technologies have developed, the use of various types of media devices, such as a smart phone and the like, has increased. A software platform is widely used and many applications are provided and thus, the media equipment or devices may include various functions.

Among the various functions, applications for capturing and transferring a still picture, viewing and transferring a moving picture, and the like have increased rapidly. Accordingly, use of an application for retrieving and managing content such as a still picture, a moving picture, and the like has also been increased.

According to a conventional method that retrieves content such as a still picture, a moving picture, and the like, functions or applications included in the media equipment which arrange the content are complex.

Therefore, a user may need to expend much effort searching for a desired content.

SUMMARY OF THE INVENTION

Aspects of the present invention are to address at least the above-mentioned problems and/or disadvantages and to provide at least the advantages described below. Accordingly, an aspect of the present invention is to provide a method of readily retrieving a content in a media equipment.

Another aspect of the present invention is to provide a content arranging method that improves user experience in a media equipment.

In accordance with an aspect of the present invention, a content arranging method in a media equipment is provided. The method includes extracting time information associated with a corresponding content from meta data of each of the stored contents, classifying the stored contents based on the extracted time information and a time interval for arranging the contents, determining at least one time item corresponding to the time interval, and arranging each of the classified contents under a corresponding time item.

In accordance with another aspect of the present invention, a content arranging apparatus in a media equipment is provided. The apparatus includes a memory unit storing at least one content, and a controller to extract time information associated with a corresponding content from meta data of each of the stored contents, to classify the stored contents based on the extracted time information and a time interval for arranging the stored contents, to determine at least one time item corresponding to the time interval, and to arrange each of the classified contents under a corresponding time item.

In accordance with another aspect of the present invention, a processor-readable medium stores a program for extracting time information associated with a corresponding content from meta data of each of the stored contents, classifying the stored contents based on the extracted time information and a time interval for arranging the stored contents, determining at least one time item corresponding to the time interval, and arranging each of the classified contents under a corresponding time item.

According to exemplary embodiments of the present invention, contents stored in a media equipment are arranged based on a time so that a user may readily retrieve a desired content.

Also, according to embodiments of the present invention, a user may readily retrieve a content satisfying a desired filtering condition.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described in the foregoing, according to a conventional content arranging method, a user may have difficulty in retrieving a desired content.

Accordingly, exemplary embodiments of the present invention provide a method of arranging contents based on a time, so that the user may readily retrieve a content.

In addition, exemplary embodiments of the present invention provide a method of arranging only contents satisfying a filtering condition desired by a user, so that the user may readily retrieve a desired content.

Hereinafter, in the descriptions of embodiments of the present invention, it is assumed that a media equipment is equipped with a touch screen.

Hereinafter, the media equipment is a device that is capable of performing at least one of recording, displaying, and playing back a media, and includes a portable phone, a smart phone, a navigation, a Personal Digital assistant (PDA), a Portable Multimedia Player (PMP), a Moving Picture Experts Group layer 3 (MP3) player, a game console, a tablet, a netbook, a desktop computer, a notebook computer, a communication terminal that is capable of accessing Internet, a communication terminal that is capable of receiving broadcasts, and the like.

Hereinafter, embodiments of the present invention will be described with reference to the attached drawings.

Figure 1:
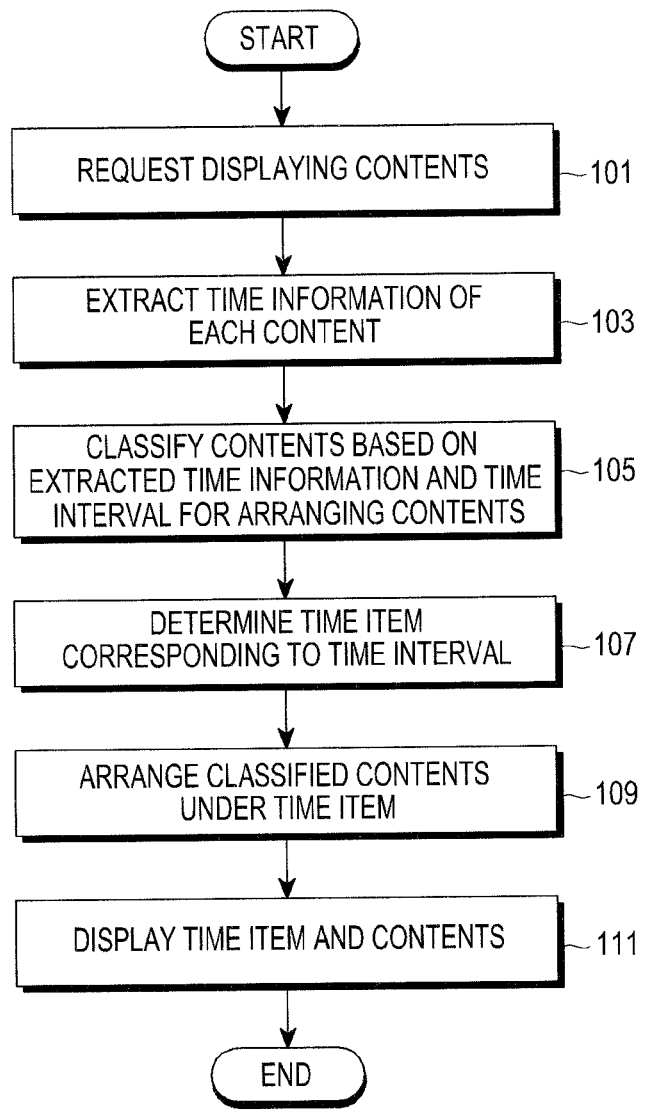
FIG. 1 is a flowchart illustrating a content arranging method according to an exemplary embodiment of the present invention.

FIG. 1 is a flowchart illustrating a content arranging method according to an exemplary embodiment of the present invention. Hereinafter, the content arranging method according to an exemplary embodiment of the present invention will be described with reference to FIG. 1.

In step 101, a media equipment proceeds with step 103 when a content display request is received from a user. The content display request indicates that the user requests displaying a list or the contents of a content corresponding to at least one type of a text, an audio, an image, an animation, and a video stored in the media equipment. The content display request may be requested by manipulating a button included in one side of the media equipment or by selecting a menu on a display area of the media equipment.

In step 103, the media equipment extracts time information of each stored contents and proceeds with step 105. The time information of each content may be extracted from meta data associated with each content. The time information of each content may be, for example, a creation time of a corresponding content. According to an exemplary embodiment of the present invention, the time information of each content may indicate a correction time corresponding to a most recent time when a corresponding content is corrected, or a move-in time corresponding to a time when a corresponding content is transferred to the media equipment.

In step 105, the media equipment classifies the contents based on the extracted time information and a time interval for arranging the contents, and proceeds with step 107. The time interval for arranging the contents may indicate a criterion that determines a time unit to be used for classifying the stored contents. The time interval for arranging the contents may be adjusted by the user, which will be described in detail with reference to associated drawings.

In step 107, the media equipment determines a time item corresponding to the time interval for arranging the contents, and proceeds with step 109. The time item may be a criterion to be used for arranging the classified contents. For example, when the time interval for arranging the contents is a year, the time item may be determined to be 2008, 2009, 2010, 2011, and the like. Also, when the time interval for arranging the contents is, for example, a month, the time item may be determined to be June 2011, July 2011, August 2011, and the like.

In step 109, the media equipment arranges the classified contents under the time item and proceeds with step 111. Here, arranging under the time item indicates that each of the contents classified based on the time interval for arranging the contents is arranged under a corresponding time item. For example, when the time interval for arranging the contents is a year, the time item is determined to be 2008, 2009, 2010, and 2011, and time information extracted from a content is Oct. 10, 2011, the media equipment arranges the corresponding content under an item of 2011.

In step 111, the media equipment may display the determined time item and the classified contents on a set display area. An example of displaying the determined time item and the classified contents will be described with reference to FIG. 2.

Figure 2:
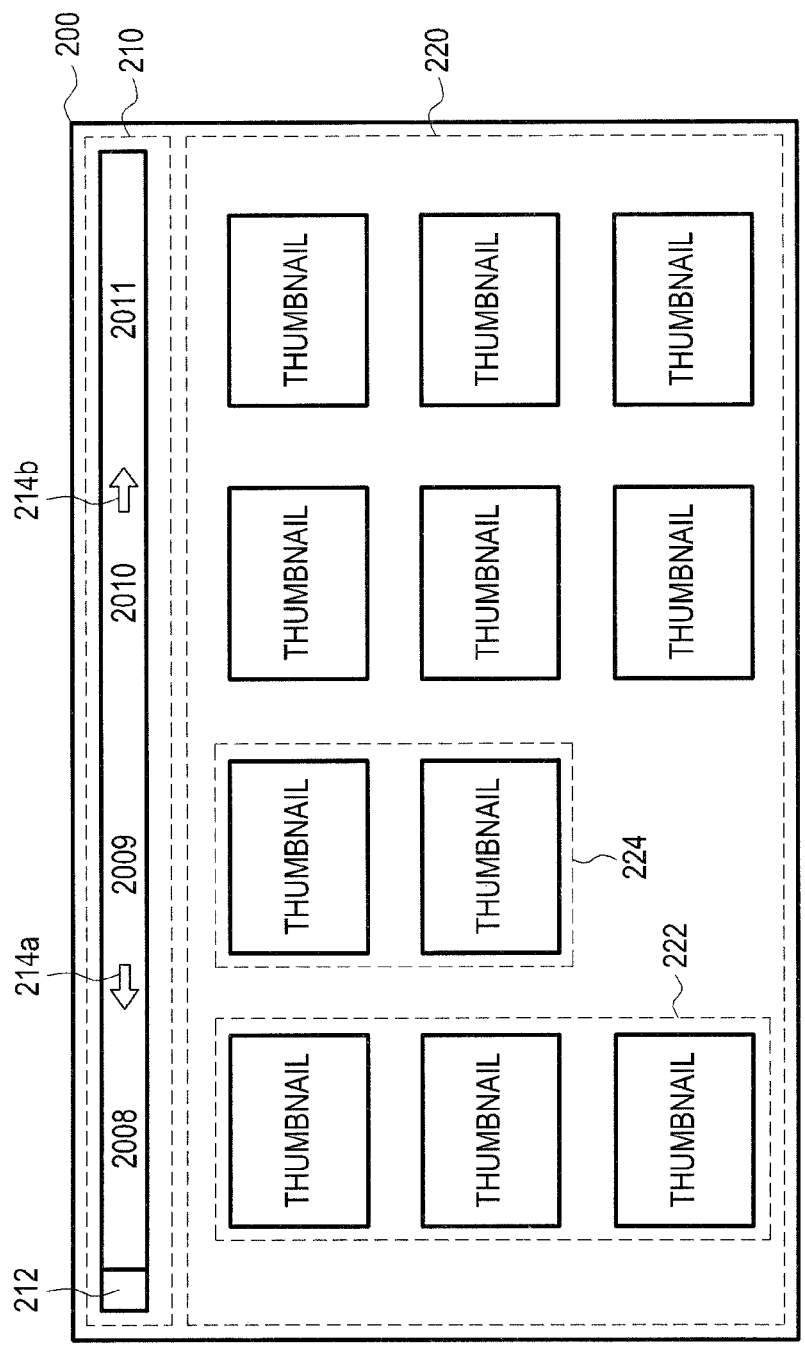
FIGS. 2 and 3 are diagrams illustrating a process of displaying a time item and arranged contents according to an exemplary embodiment of the present invention.

FIG. 2 is a diagram illustrating a process of displaying a time item and arranged contents according to an exemplary embodiment of the present invention.

When the time item and the arranged contents are displayed, a media equipment may display the time item on a first display area 210 and may display the arranged contents on a second display area 220. Here, the first display area 210 and the second display area 220 are located in a display area 200 of the media equipment, and the areas are distinguished from each other.

When the time item is displayed on the first display area 210, the media equipment may display a predetermined number of time items. For example, when 11 time items from 2001 to 2011 are determined based on a year, the media equipment may display a predetermined number of time items, for example, 4 time items. FIG. 2 illustrates an example in which 4 time items, that is, '2008', '2009', '2010', and '2011' are displayed. A number of displayed time items may be predetermined, or may be determined by a user.

The media equipment may move a time item according to a swiping motion of the user performed on the first display area 210. For example, as illustrated in FIG. 2, in a state where the time items, that is, '2008', '2009', '2010', and '2011' are displayed, when the user performs a swiping motion to the right on the first display area 210, the media equipment may display time items corresponding to previous years, for example, '2004', '2005', '2006', and '2007'.

A time interval for arranging contents may be adjusted by the user. For example, the time interval for arranging the contents may be changed according to a pinch motion of the user performed on the first display area 210.

Figure 3:
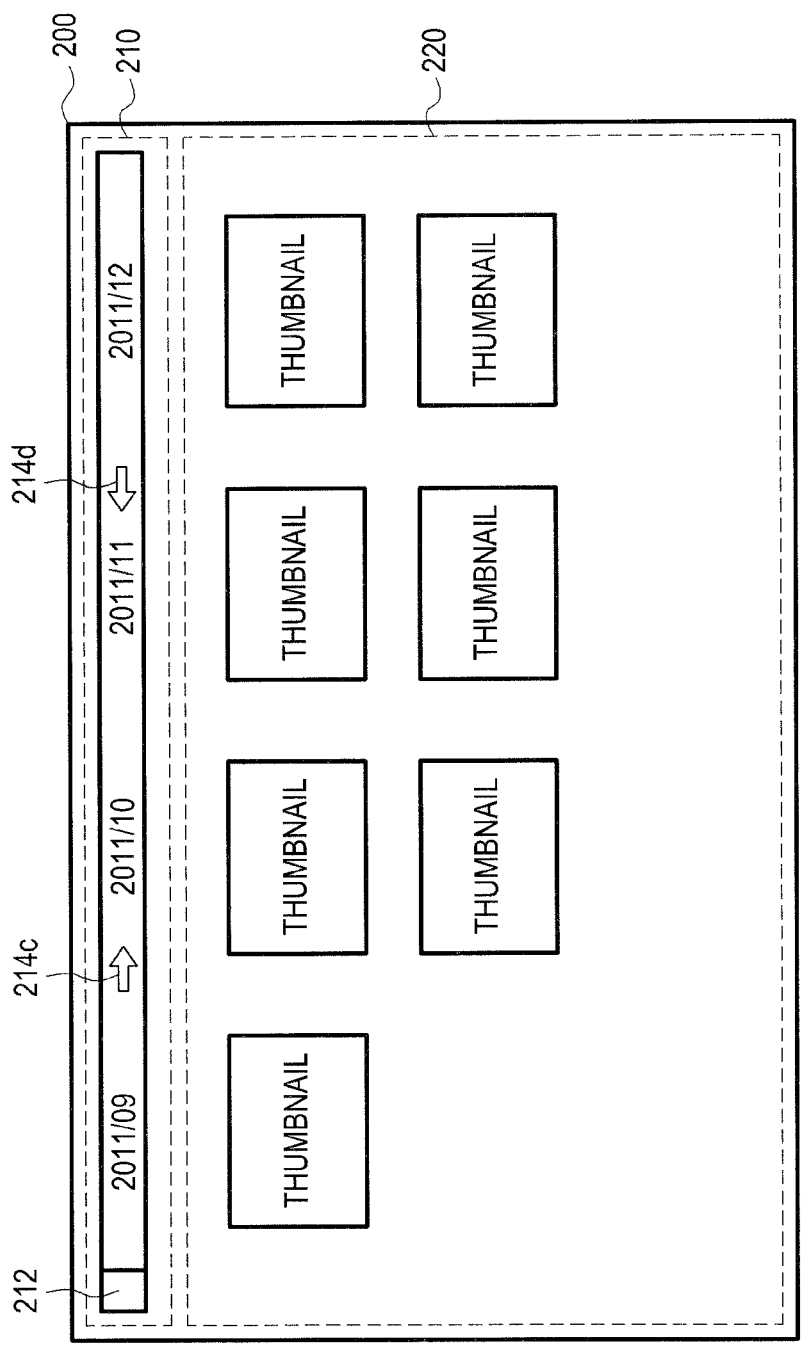

For example, when the user presses two points on the first display area 210 using two fingers and moves both fingers in outward directions 214a and 214b, the media equipment may decrease the time interval. For example, in the case where the time interval is a year as illustrated in FIG. 2, when the user presses two points on the first display area 210 using two fingers and moves both fingers in outward directions 214a and 214b, the media equipment may decrease the time interval to a month as illustrated in FIG. 3.

When the user presses the two points on the first display area 210 using two fingers and moves both fingers in inward directions 214c and 214d, the media equipment may increase the time interval. For example, in the case where the time interval is a month as illustrated in FIG. 3, when the user presses two points on the first display area 210 using two fingers and moves both fingers in inward directions 214c and 214d, the media equipment may increase the time interval to a year as illustrated in FIG. 2.

Depending on the exemplary embodiments of the present invention, the user may adjust the time interval by selecting a predetermined menu 212 displayed on the first display area 210.

When the arranged contents are displayed on the second display area 220, the media equipment may display each content to correspond to a corresponding time item. For example, when the time item is displayed on the first display area 210 widthwise, the media equipment may display contents of each time item under each time item lengthwise on the second display area 220. For example, contents 222 are contents corresponding to time item '2008', and contents 224 are contents corresponding to time item '2009'.

When contents are displayed on the second display area 220, the media equipment may display a predetermined number of contents. For example, the media equipment may display a predetermined number of contents, for example, 3 contents, for each time item. The number of contents displayed for each time item may be predetermined, or may be determined by the user.

The media equipment may move a content according to a swiping motion of the user performed on the second display area 220. For example, in the case where four or more contents correspond to the time item '2008', when the user performs a swiping motion in a downward direction on the second display area 220, the media equipment may display subsequent contents corresponding to the time item '2008'.

When the contents are displayed, the media equipment may display each content in a form of a thumbnail. For this, the media equipment may extract a thumbnail from metadata associated with a corresponding content so as to display the thumbnail, or may create a thumbnail associated with a corresponding content so as to display the thumbnail.

As described in the foregoing, the content arranging method according to an exemplary embodiment of the present invention has been described. Recently, a memory capacity of the media equipment has been increased and thus, a large amount of content may be stored. Therefore, when the contents are arranged, more detailed classification may be required. Hereinafter, a content arranging method that arranges contents by finely dividing a time item will be described with reference to FIG. 4.

Figure 4:
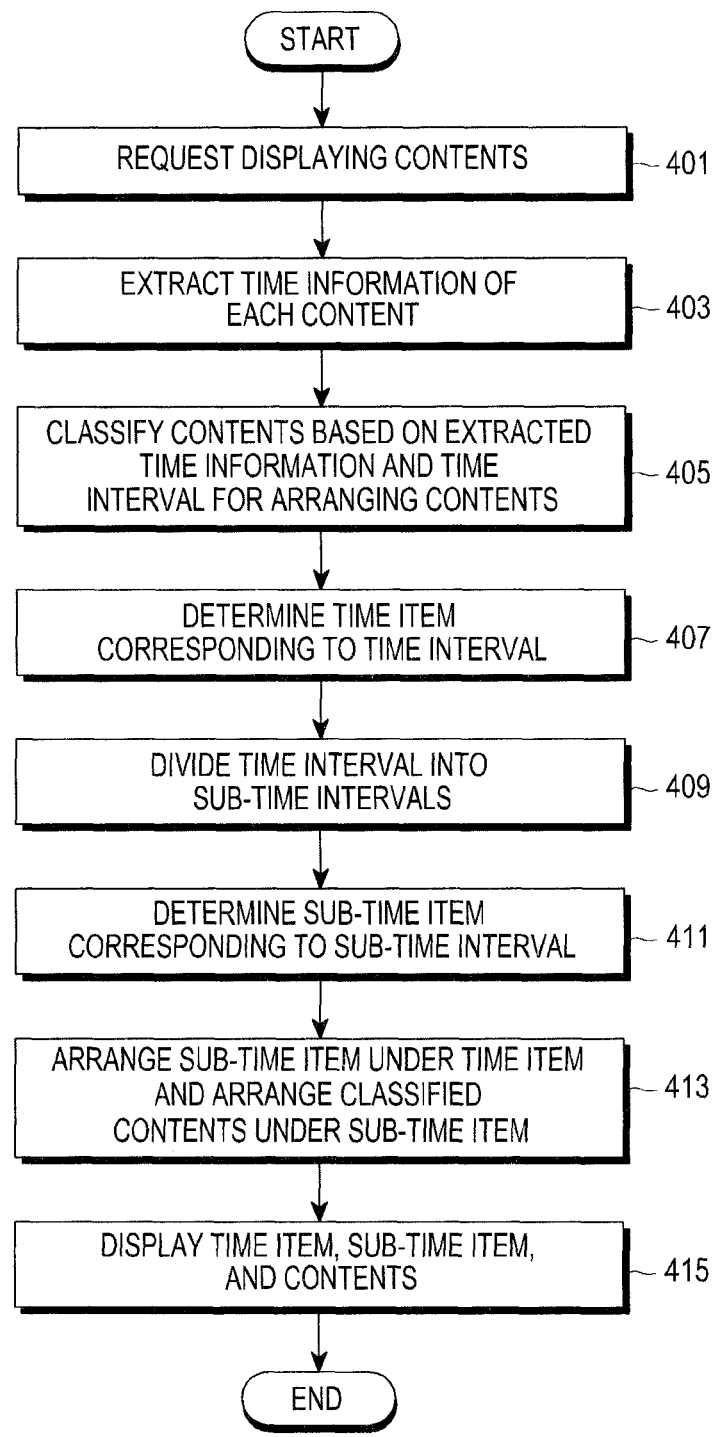
FIG. 4 is a flowchart illustrating a content arranging method according to another exemplary embodiment of the present invention.

FIG. 4 is a flowchart illustrating a content arranging method according to another exemplary embodiment of the present invention. Hereinafter, the content arranging method according to another embodiment will be described with reference to FIG. 4.

An exemplary embodiment of the present invention to be described with reference to FIG. 4 describes dividing each time item into a plurality of sub-time items, and arranging contents under a sub-time item. This may enable a user to readily determine contents when a large amount of content is stored in the media equipment.

Steps 401 through 407 are identical to step 101 through step 107 of FIG. 1 and thus, the descriptions thereof will be omitted.

In step 409, the media equipment divides a time interval for arranging contents into a plurality of sub-time intervals, and proceeds with step 411. For example, when the time interval for arranging contents is a year, the media content may divide the time interval for arranging contents into sub-time intervals of months. A rule for dividing the time interval into the sub-time intervals, for example, a rule associated with whether a time interval of a year is divided into sub-time intervals of months or into sub-time intervals of a quarter, may be changed based on settings. When the time interval is adjusted according to a pinch motion of the user, the sub-time interval may be adjusted according to the pinch motion.

In step 411, the media equipment determines a sub-time item corresponding to the sub-time interval, and proceeds with step 413. For example, when the sub-time interval is a month, the media equipment may determine the sub-time item to be June, July, August, September, and the like.

In step 413, the media equipment arranges the sub-time item under the time item, arranges classified contents under the sub-time item, and proceeds with step 415. For example, when the time item is 2008, 2009, 2010, and 2011, the sub-time item is June, July, August, and September, and time information extracted from a content is August 2009, the media equipment may arrange the sub-time item 'August' under the time item '2009', and arranges a corresponding content under the sub-time item 'August'.

In step 415, the media equipment may display the time item, the sub-time item, and arranged contents. An example of displaying the time item, the sub-time item, and arranged contents will be described with reference to FIG. 5.

Figure 5:
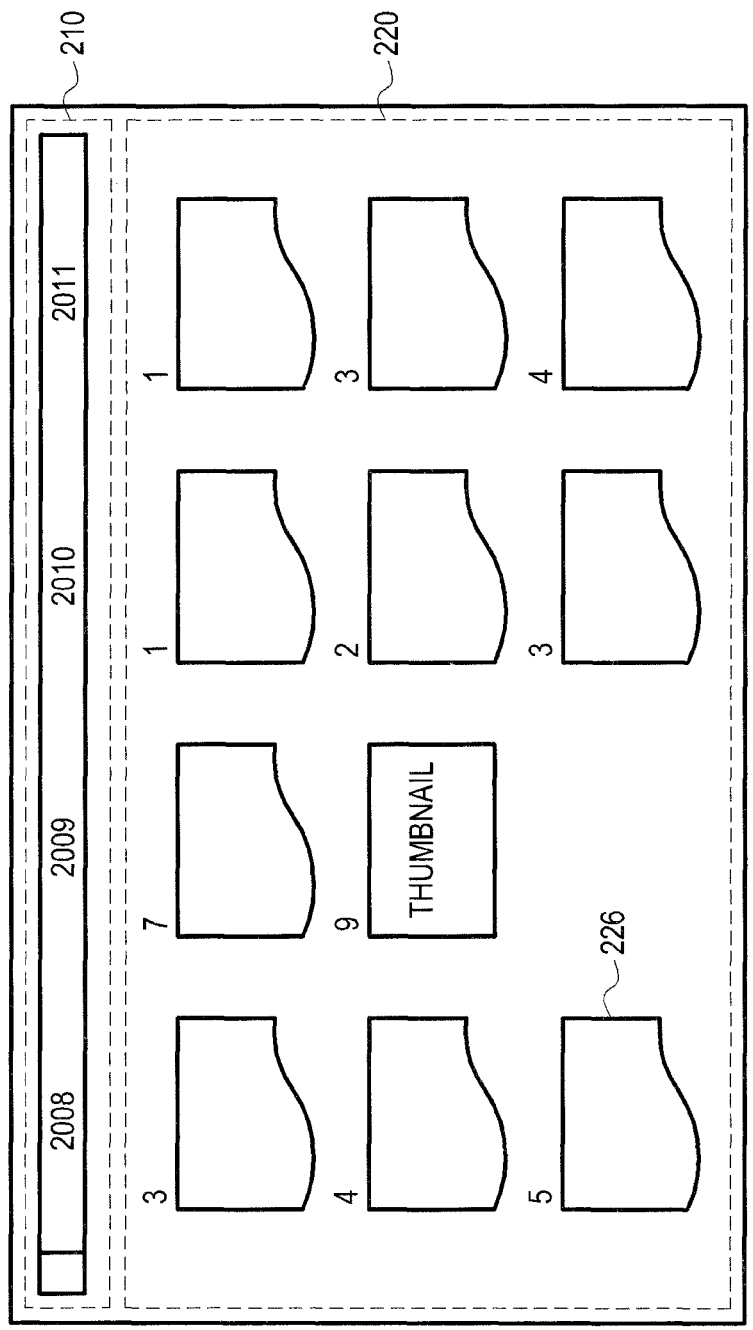
FIG. 5 is a diagram illustrating a process of displaying a time item, a sub-time item, and arranged contents according to another exemplary embodiment of the present invention.

FIG. 5 is a diagram illustrating a process of displaying a time item, a sub-time item, and arranged contents according to another exemplary embodiment of the present invention.

When the time item, the sub-time item, and the arranged contents are displayed, the media equipment may display the time item on the first display area 210, and may display the sub-time item and the arranged contents on the second display area 220. Determining and moving the time item, adjusting the time interval, and the like have been described with reference to FIG. 2 and thus, the detailed description thereof will be omitted.

When the sub-time item and the arranged contents are displayed on the second display area 220, the media equipment displays the sub-time item and contents corresponding to the sub-time item to correspond to the time item. For example, in the case where the time item is displayed on the first display area 210 widthwise as illustrated in FIG. 5, the media equipment may display corresponding sub-time items for each time item and corresponding contents for each sub-time item under each time item, lengthwise. Referring to FIG. 5, '3', '4', and '5' are arranged as sub-time items of a time item '2008'. The sub-time items '3', '4', and '5' may correspond to March, April, and May, respectively. Similarly, other sub-time items may be used to indicate the respective months of the year, such as for example '1' for January and '12' for December.

When the arranged contents are displayed on the second display area 220, the media equipment may display all contents of each sub-time item. When each sub-time item has a large number of contents, the media equipment may display an image in a form of a folder 226 indicating that a plurality of contents exist in a corresponding sub-time item. When the image in the form of a folder 226 is displayed, thumbnails of a few contents of the corresponding sub-time item may be displayed in the image in the form of a folder. When a single content corresponding to a sub-time item exists, the corresponding content may be displayed in a form of a thumbnail '9'.

Moving a content according to a swiping motion of the user performed on the second display area 220 has been described with reference to FIG. 2 and thus, detailed descriptions thereof will be omitted.

According to exemplary embodiments of the present invention described with reference to FIGS. 1 through 5, contents are arranged based on time information of the contents and thus, the user may readily retrieve a content.

In the exemplary embodiments of the present invention described with reference to FIGS. 1 through 5, when one of a time item and a sub-time item is selected, the media equipment may display only contents corresponding to the selected time item or the selected sub-time item, which will be described with reference to FIGS. 6A through 6C.

Figure 6A:
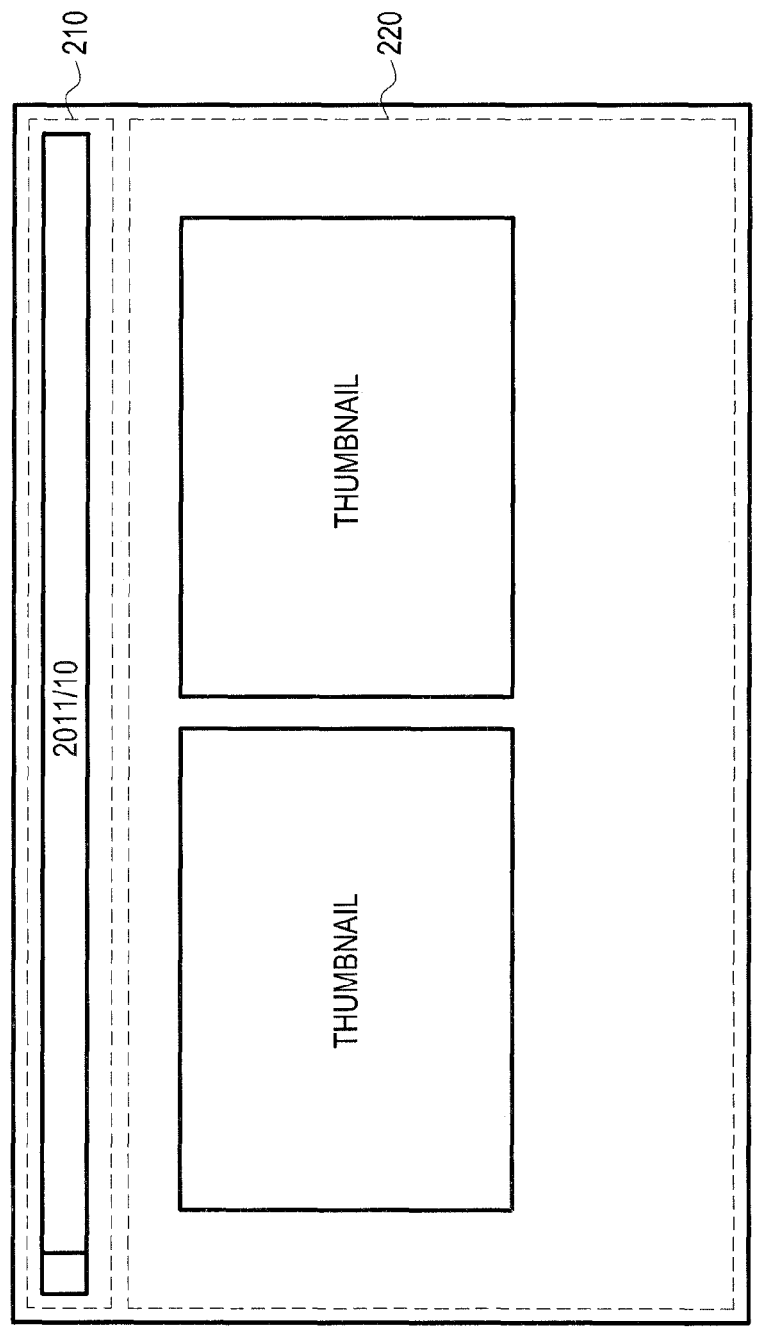
FIGS. 6A through 6C are diagrams illustrating a process of displaying contents according to exemplary embodiments of the present invention.

The media equipment displays, on the first display area 210, a selected time item or a selected sub-time item, and may display, on the second display area 220, thumbnails of contents corresponding to the selected time item or the selected sub-time item, as illustrated in FIG. 6A.

Figure 6B:
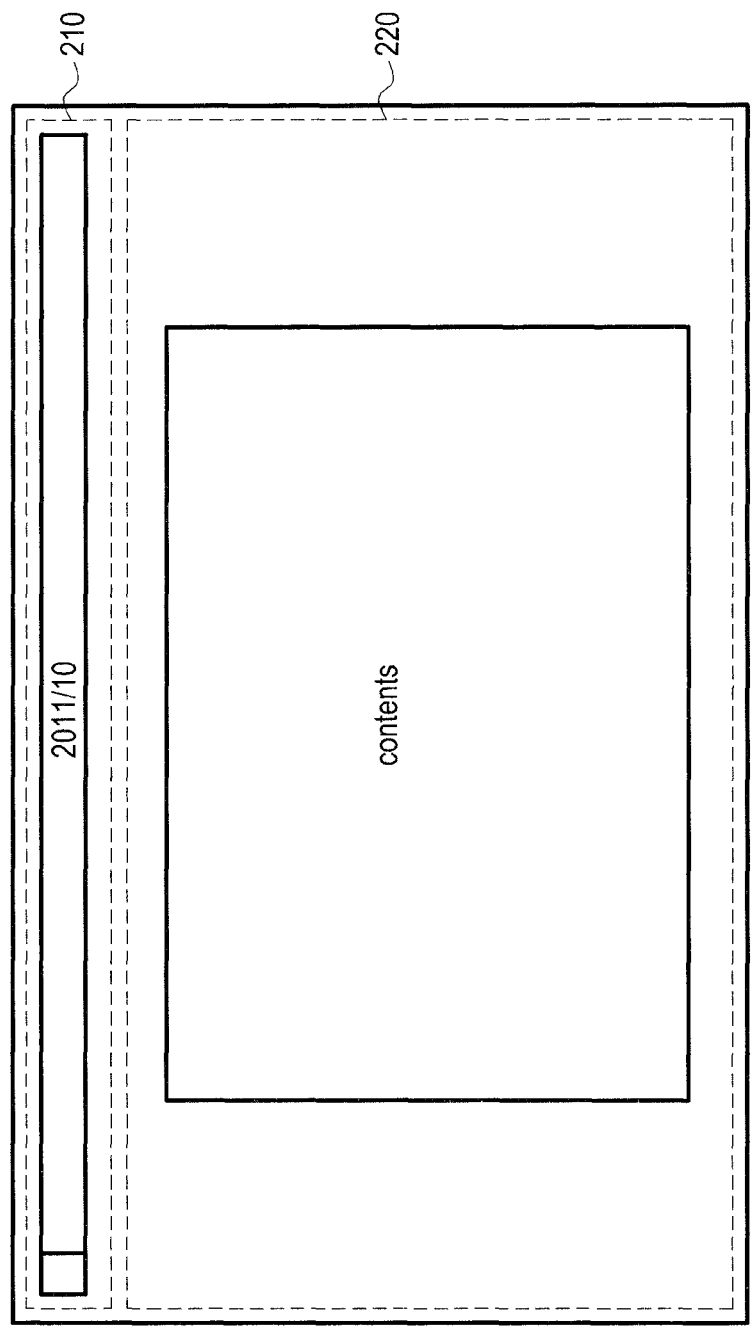

The media equipment may display, on the entire second display area 220, the contents of a corresponding content, as opposed to displaying the thumbnail of the content, as illustrated in FIG. 6B.

Figure 6C:
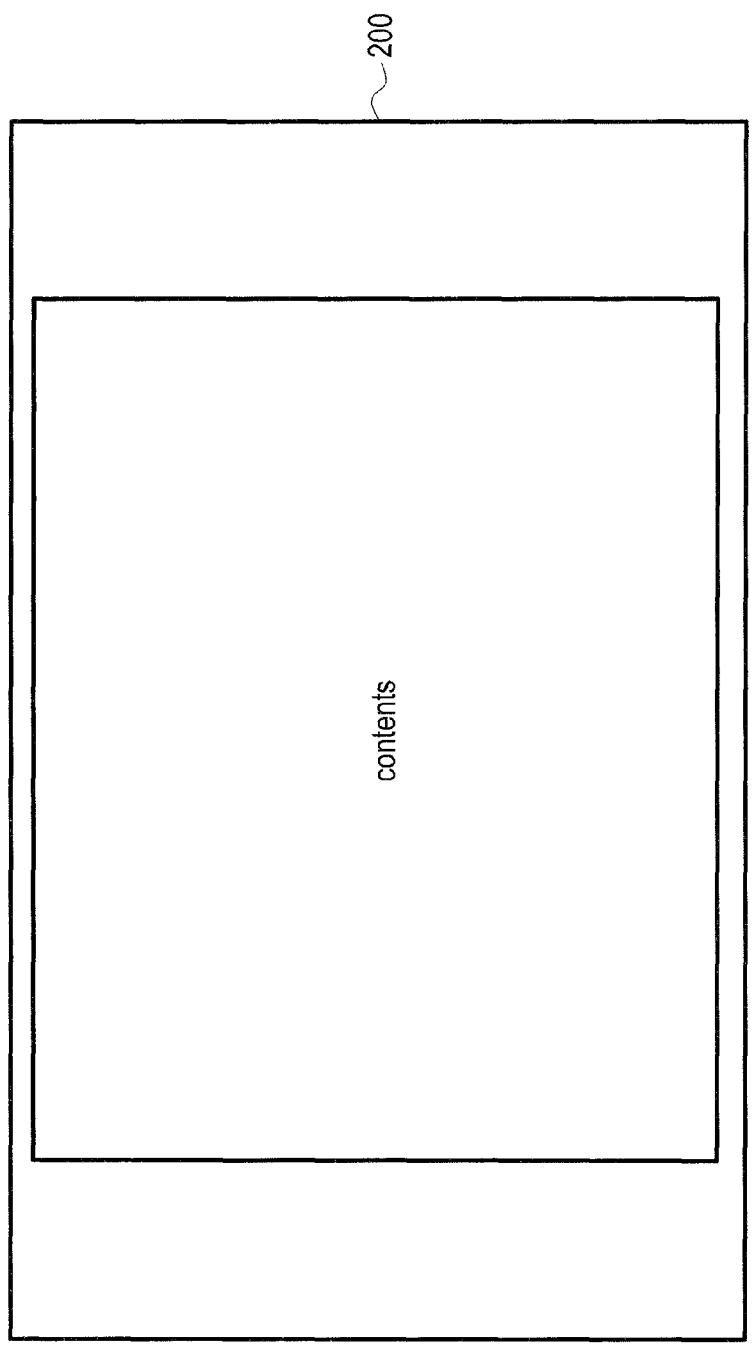

The media equipment may display the contents of a corresponding content on the entire display area 200, as illustrated in FIG. 6C.

The displayed content may be moved according to a swiping motion of a user, from the display state of FIGS. 6A through 6C. For example, when it is assumed that three or more contents correspond to a time item '2011/10' indicating October 2011 in the display state of FIG. 6A, and a swiping motion of the user performed in an upward direction or a downward direction on the display area 200, the media equipment may display a previous content or a subsequent content of the contents corresponding to the time item '2011/10'.

For example, when a swiping motion of the user performed to the left on the display area 200 is recognized in the display state of FIGS. 6A through 6C, the media equipment may display contents corresponding to a subsequent time item, for example, a time item '2011/11' indicating November 2011. Conversely, when a swiping motion of the user performed to the right on the display area 200 is recognized, the media equipment may display contents corresponding to a previous time item, for example, a time item '2011/9' indicating September 2011.

In the exemplary embodiments of the present invention described with reference to FIGS. 1 through 5, when a motion of a user that directly selects a displayed content is recognized as opposed to selecting a time item or a sub-time item, the media equipment may display the corresponding content in a form as illustrated in FIG. 6B or FIG. 6C. In this example, the content may be moved according to a swiping motion performed to the left, to the right, up, or down.

The media equipment may provide a filtering menu for filtering contents arranged based on a time. For example, when a menu displayed on the first display area 210 is selected, the media equipment may display filtering menus on the second display area 220. Subsequently, when a filtering menu is selected by the user, the media equipment may provide a settings screen associated with the corresponding filtering menu to the user. When a filtering condition is set by the user, the media equipment may display only contents satisfying the set filtering condition. One or more filtering conditions may be selected.

For example, the filtering condition may include a period, a season, a weather, a location, a device, a person, a type, and the like. Hereinafter, the filtering condition will be described in detail.

Figure 7:
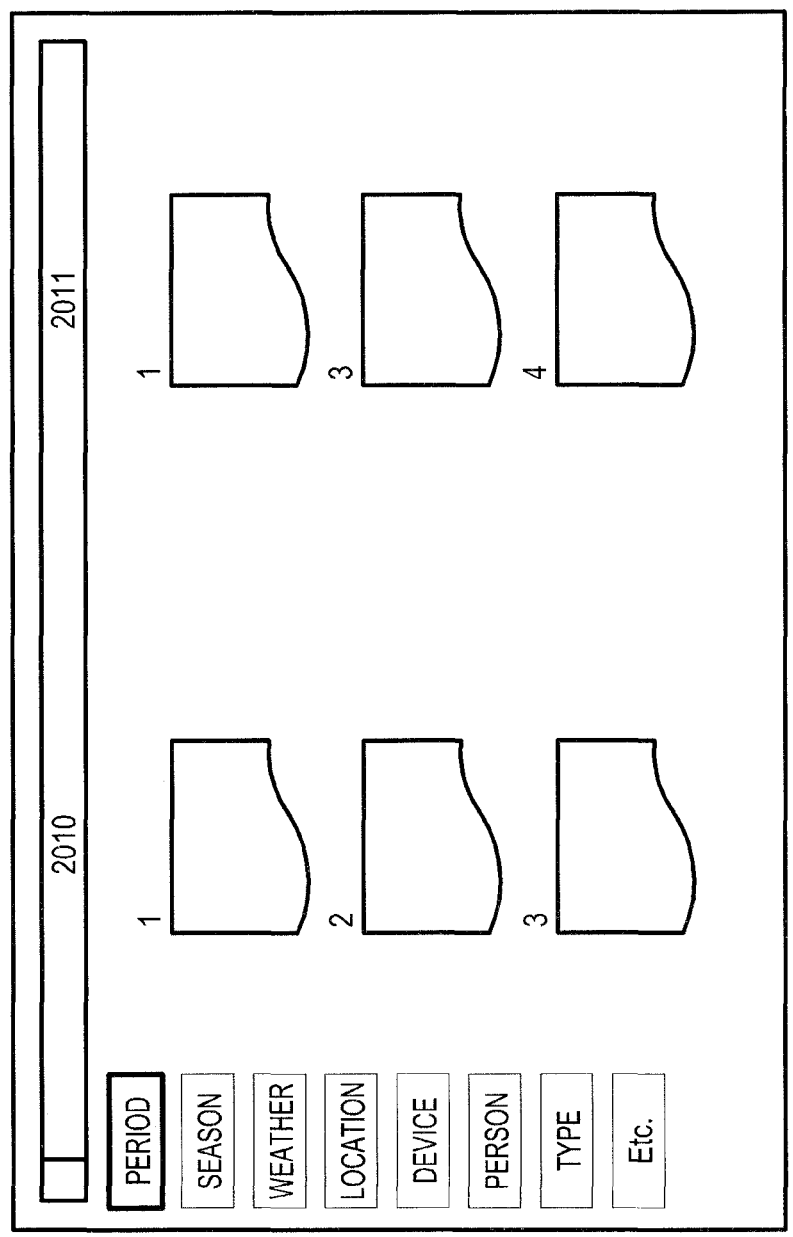
FIGS. 7 through 13 are diagrams illustrating a process of displaying contents satisfying a filtering condition according to exemplary embodiments of the present invention.

The period is a filtering condition for arranging and displaying contents created during a predetermined period. For example, when the user selects a filtering condition 'period', and sets a period for filtering to a period from January 2010 to December 2011, the media equipment may arrange and display contents corresponding to the period between January 2010 and December 2011, as illustrated in FIG. 7.

Figure 8:
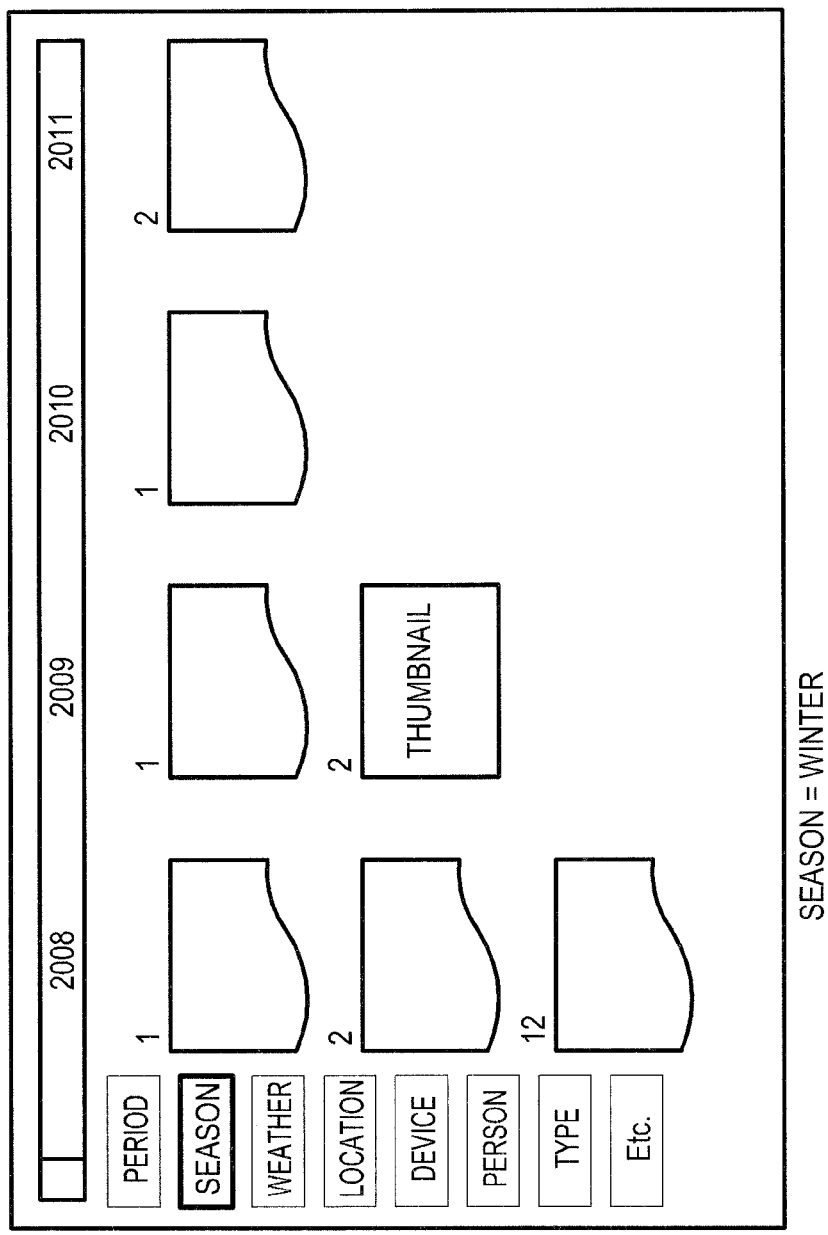

The season is a filtering condition for arranging and displaying contents created during a predetermined season. For example, when the user selects a filtering condition 'season', and sets a season for filtering to 'winter', the media equipment may arrange and display contents between December and February corresponding to winter, as illustrated in FIG. 8.

Figure 9:
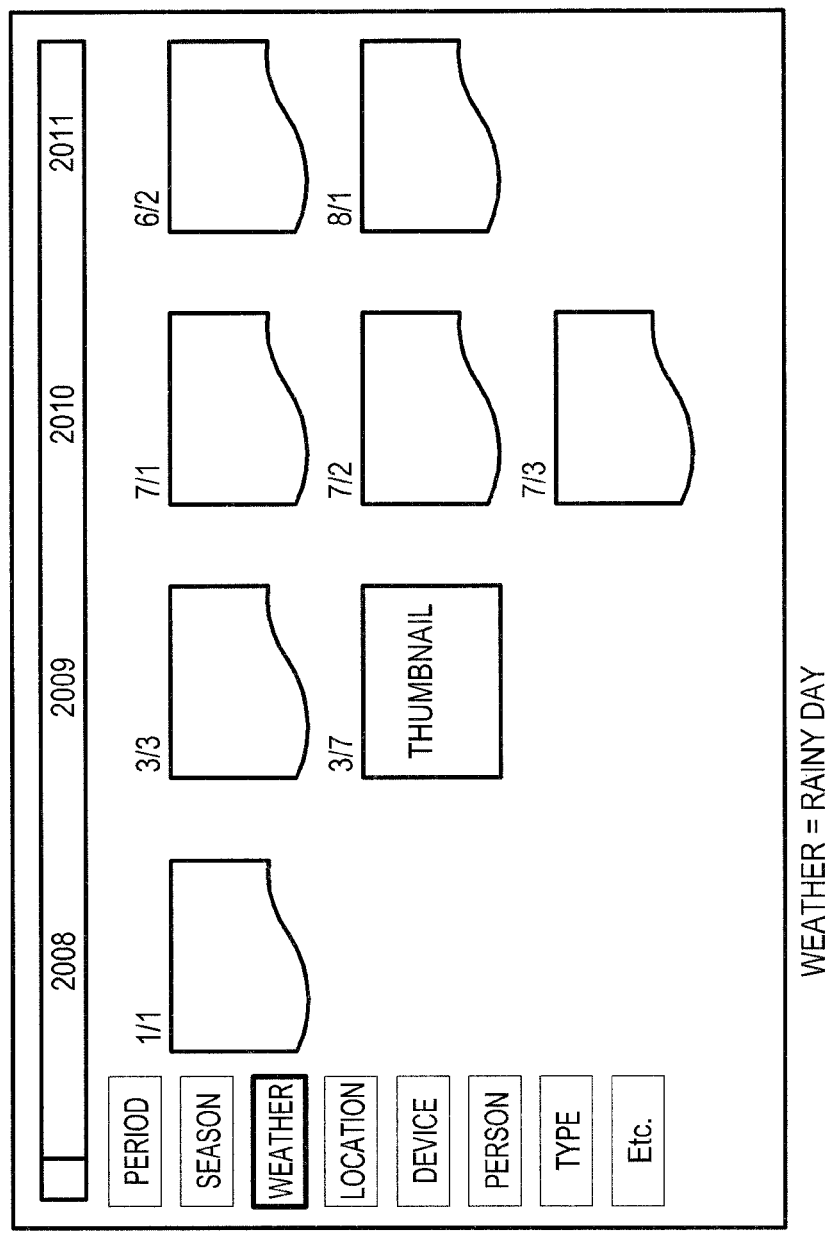

The weather is a filtering condition for arranging and displaying contents created during a predetermined weather. For example, when the user selects a filtering condition 'weather', and sets a weather for filtering to a 'rainy day', the media equipment may display contents created during a rainy day, as illustrated in FIG. 9. Accordingly, the media equipment may collect weather information from a weather server of the Meteorological Office that stores daily weather information of a wide range of period. The weather information may be collected, periodically or every time that the filtering condition 'weather' is selected. Also, the collected weather information may be stored in the media equipment.

When the filtering condition is set to 'rainy day' and the weather information is collected, the media equipment detects whether a content created during a rainy day exists. When a content created during a rainy day exists, the media equipment may determine a corresponding day to be a sub-time item, and may display associated contents.

Figure 10:
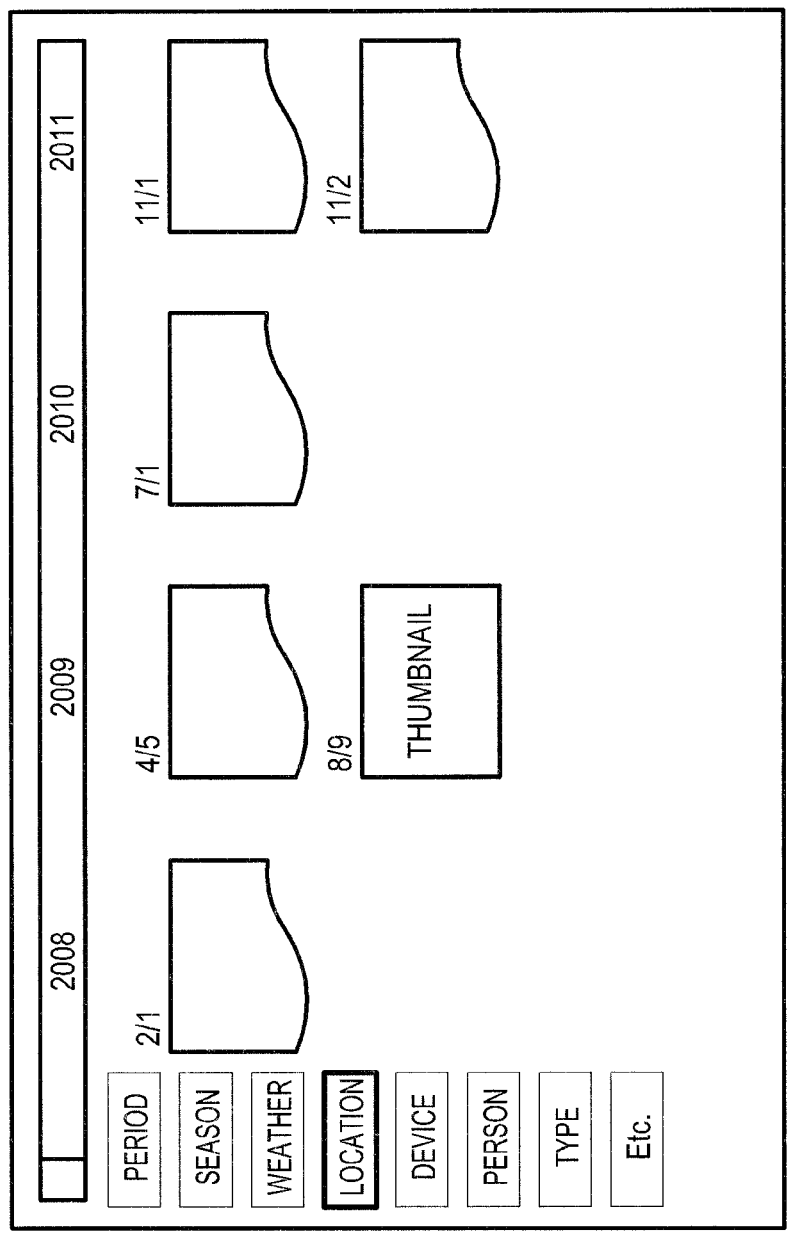

The location is a filtering condition for arranging and displaying contents created in a predetermined location. For example, when the user selects a filtering condition 'location' and sets a location for filtering to 'Seoul', the media equipment may display contents created in Seoul, as illustrated in FIG. 10. Recently, media equipments store meta data indicating a location where a corresponding content is generated, together with the corresponding content when the content is created and thus, a location condition may be extracted from meta data of each content.

Figure 11:
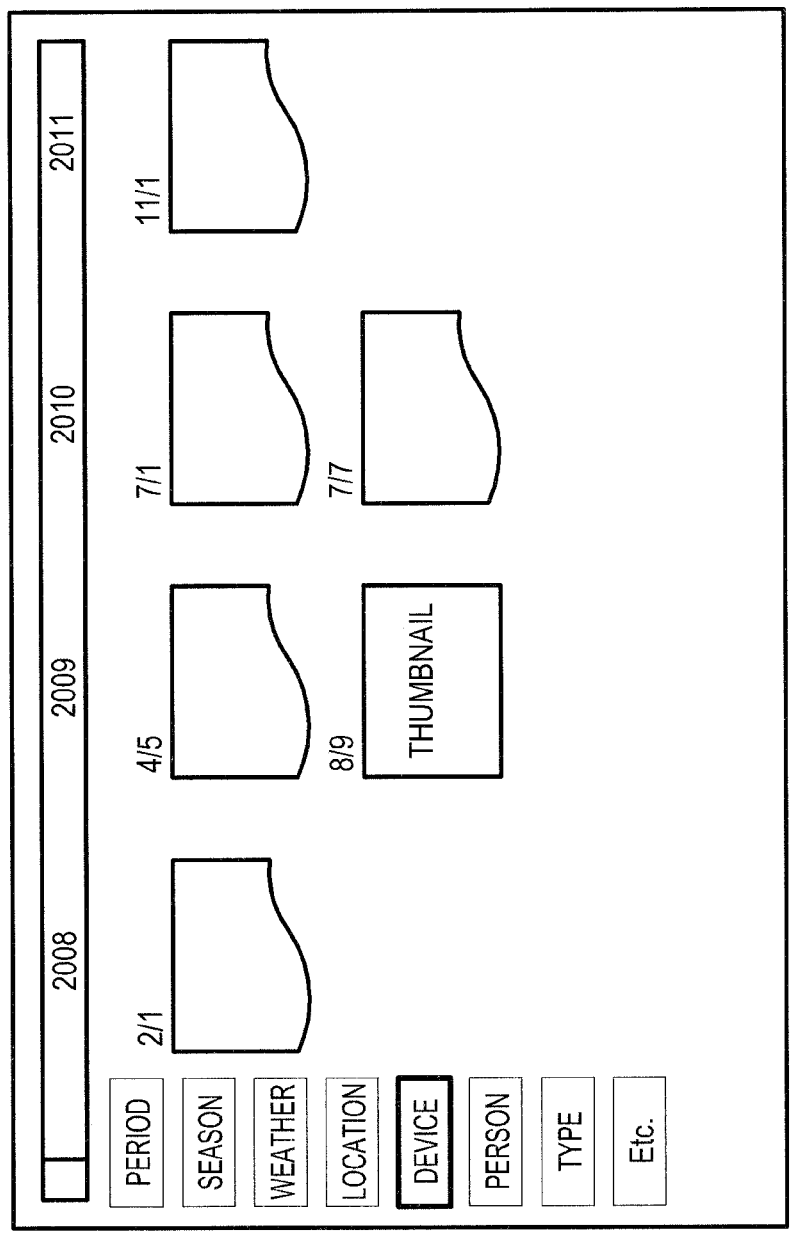

The device is a filtering condition for arranging and displaying contents created by a predetermined device. For example, the filtering condition is associated with whether to arrange and display contents created by a corresponding device or to arrange and display contents downloaded from another device. For example, when the user selects a filtering condition 'device', and sets a device for filtering to 'corresponding device', the media equipment may display contents created by the corresponding device, as illustrated in FIG. 11. Recently, media equipments store meta data indicating a device where a corresponding content is created, together with the corresponding content when the content is created and thus, a device condition may be extracted from meta data of each content.

Figure 12:
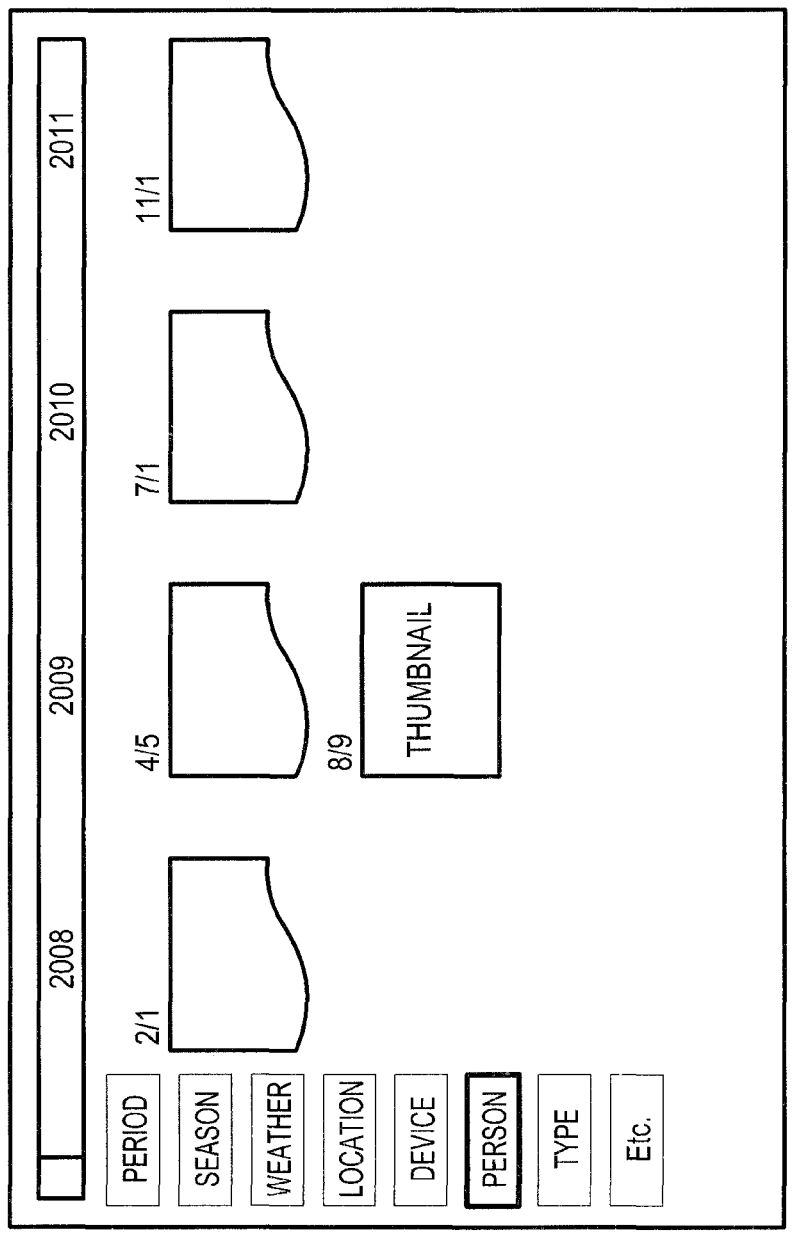

The person is a filtering condition for arranging and displaying contents associated with a predetermined person. For example, when the user selects a filtering condition 'person', and sets a person for filtering to 'Hong Gildong', the media equipment may display contents associated with Hong Gildong, as illustrated in FIG. 12. For example, when a content is an image, the media equipment may display the corresponding image by determining whether a person corresponding to 'Hong Gildong' exists in the corresponding image. Accordingly, the media equipment may use a face recognition technology contained in the media equipment. A face recognition technology available in the media equipment may include, for example, a knowledge-based method, a feature-based method, and the like, but the exemplary embodiments of the present invention are not limited thereto.

A predetermined person may be set as a filtering condition by inputting a text. For example, when the user inputs a name of 'Hong Gildong' and an image associated with Hong Gildong is stored in the media equipment, the media equipment may detect whether a person corresponding to Hong Gildong exists in the corresponding image by applying the face recognition technology. In this example, a predetermined group which is grouped in advance may be set to be a filtering condition as opposed to setting a predetermined person to be a filtering condition.

A predetermined person may be set as a filtering condition by selecting a predetermined image. For example, when the user selects a predetermined person included in a predetermined image, the media equipment may apply the face recognition technology to the predetermined person selected from the predetermined image, and may detect whether an image including the selected predetermined person exists.

According to an exemplary embodiment of the present invention, when many persons are selected, the media equipment may display an image including one of the corresponding persons, or may display only an image including all the selected persons, or may display only an image excluding corresponding persons, which depends on settings.

Figure 13:
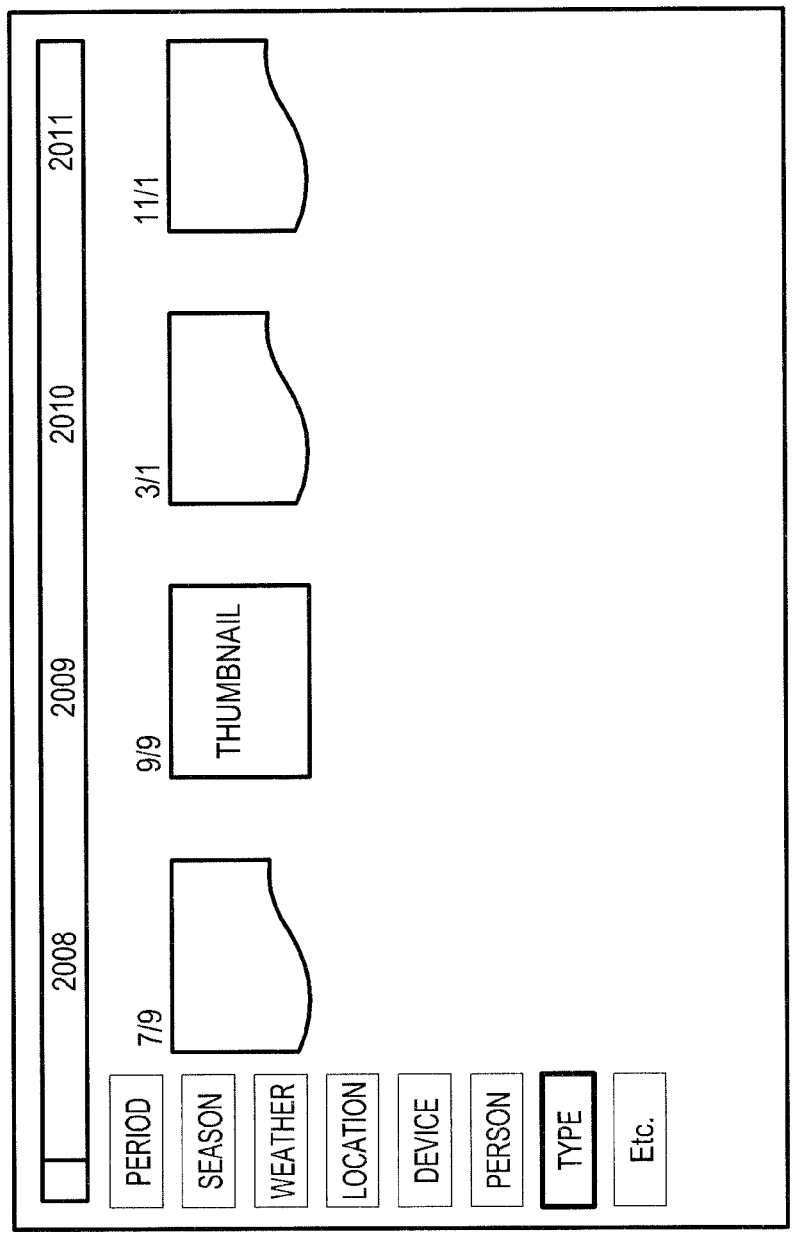

The type is a filtering condition for arranging and displaying contents corresponding to a predetermined type. For example, when the user selects a filtering condition 'type', and sets a type for filtering to be 'document', the media equipment may display contents of which file types are the document, as illustrated in FIG. 13.

The set filtering condition may be canceled by selecting a menu displayed on a display area, or by a swiping motion of the user performed on the display area or the like. For example, when the user presses a point on the first display area 210 and performs a swiping motion to a bottom point on the second display area 220, all the set filtering conditions may be cancelled.

In the exemplary embodiments of the present invention described with reference to FIGS. 1 through 13, the media equipment may display a menu for returning to a previous screen. When the user selects the menu for returning to the previous screen, the media equipment may return to a screen that is previously displayed. In this example, the media equipment returns to the previous screen, and maintains a time item and a filtering condition which are criteria for arranging and displaying contents in the previous screen.

The content arranging method according to the exemplary embodiments of the present invention has been described with reference to associated drawings. Hereinafter, a content arranging apparatus according to exemplary embodiments of the present invention will be described with reference to associated drawings.

Figure 14:
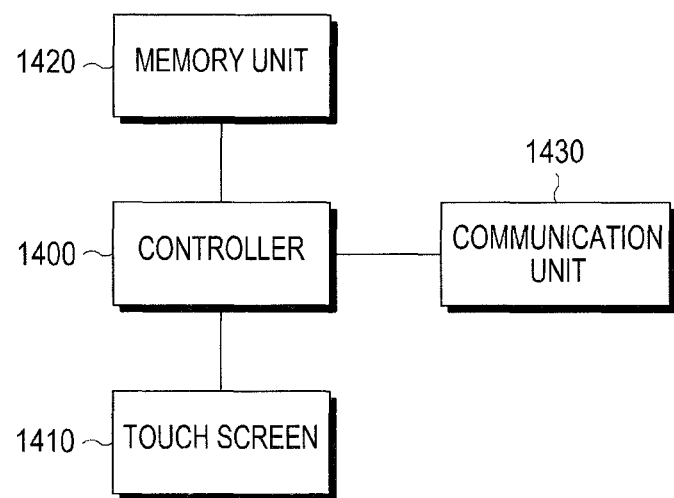
FIG. 14 is a block diagram illustrating a content arranging apparatus according to exemplary embodiments of the present invention.

FIG. 14 is a block diagram illustrating a content arranging apparatus according to exemplary embodiments of the present invention.

Referring to FIG. 14, the content arranging apparatus includes a controller 1400, a touch screen 1410, a memory unit 1420, and a communication unit 1430.

When a content display request is received from a user, the controller 1400 extracts time information associated with a corresponding content from meta data of each of stored contents, and classifies the contents based on the extracted time information and a time interval for arranging the contents. The controller 1400 determines at least one time item corresponding to the time interval for arranging the contents, and arranges each of the classified contents under a corresponding time item. The controller 1400 displays the time item on a set first display area of the touch screen 1410, and displays contents arranged to correspond to each time item on a set second display area of the touch screen 1410. The controller 1400 recognizes a pinch motion of the user performed on the touch screen 1410, and adjusts the time interval based on the recognized information, and generates a time item based on the adjusted time interval.

The controller 1400 may receive a filtering condition used for arranging only contents desired by the user. The filtering condition may be input by selecting a menu displayed on the display area. When the filtering condition is input, the controller 1400 detects whether contents satisfying the input filtering condition exist from among arranged contents, arranges only the contents satisfying the input filtering condition from among the arranged contents under the time item, and displays the contents.

The controller 1400 may divide the time interval into a plurality of sub-time intervals. Accordingly, the controller 1400 determines at least one sub-time item corresponding to the sub-time interval. The controller 1400 may arrange each sub-time item under a corresponding time item, and may arrange each of classified contents under a corresponding sub-time item. In this example, the controller 1400 displays the time item on the set first display area of the touch screen 1410, and displays, on the set second display area of the touch screen 1410, the sub-time item and contents corresponding to the sub-time item to correspond to the time item. When contents corresponding to the sub-time item are displayed, the controller 1400 may display each of the contents in a form of a thumbnail or as an image in a form of a folder indicating that a plurality of contents exists in a corresponding sub-time item, based on a number of contents included in each sub-time item.

When one of a time item and a sub-time item is selected, the controller 1400 may display contents corresponding to the selected item on a set display area of the touch screen 1410 based on a set method. In this example, the set method has been described with reference to FIGS. 6A through 6C.

The controller 1400 may generate meta data associated with a creation time of a corresponding content, a creation location, device information, and the like when the corresponding content is created.

The touch screen 1410 generates a control signal based on an input of the user, transfers the generated control signal to the controller 1400, and displays a screen based on a signal received from the controller 1400.

The memory unit 1420 stores at least one content, and may store weather information collected from an external server when weather is used as a filtering condition. When the face recognition technology is used as a filtering condition, the memory unit 1420 may store an algorithm associated with face recognition. Also, the memory unit 1420 stores address information associated with at least one person, and the stored address information is used for face recognition. The address information may include a picture of the corresponding person, and the like.

The communication unit 1430 is used for collecting weather information from a weather server of the Meteorological Office and the like.

The above-described exemplary embodiments of the present invention may be embodied in various methods. For example, exemplary embodiments of the present invention may be embodied as hardware, software or a combination of hardware and software. When the exemplary embodiments of the present invention are embodied as software, software that is implemented in one or more processors using various operation systems or platforms may be embodied. In addition, the software may be written using one of a plurality of appropriate programming languages, or may be compiled to a machine code or an intermediate code implemented in a frame work or a virtual machine.

When the exemplary embodiments of the present invention are embodied in one or more processors, the exemplary embodiments of the present invention may be embodied as a processor-readable medium that records one or more programs for executing the method embodying the various embodiments of the present invention, for example, a memory, a floppy disk, a hard disk, a compact disc, an optical disc, a magnetic tape, and the like.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An electronic device for displaying a plurality of images, the electronic device comprising:
   a touch screen;
   a memory; and
   at least one processor configured to:
   in response to receiving a request for displaying a plurality of images stored in the memory, control to display, on the touch screen, a first time item corresponding to a first time interval and one or more first thumbnail images that correspond to one or more images corresponding to the first time item respectively, wherein the plurality of images are classified according to the first time interval based on time information corresponding to each of the plurality of images, and the one or more first thumbnail images are of a predetermined first size,
   identify that a user input for a change of a time interval is received through the touch screen, and
   in response to receiving the user input for the change of the time interval, control to display, on the touch screen, a second time item corresponding to a second time interval and one or more second thumbnail images that correspond to one or more images corresponding to the second time item respectively, wherein the plurality of images are classified according to the second time interval based on the time information, and the one or more second thumbnail images are of a predetermined second size different from the predetermined first size.

2. The electronic device of claim 1, wherein the first time interval or the second time interval comprises a range based on at least one of a day, a month, or a year.

3. The electronic device of claim 1, wherein the user input for the change of the time interval comprises a press action input.

4. The electronic device of claim 1,
   wherein the user input for the change of the time interval comprises a pinch gesture through the touch screen, and
   wherein the one or more first thumbnail images or the one or more second thumbnail images are arranged in a grid on the touch screen.

5. The electronic device of claim 4, wherein the at least one processor is further configured to:
   if the pinch gesture is a first pinch gesture which presses two points on the touch screen using two fingers of a user and moves the two fingers in outward directions, classify the stored plurality of images according to the second time interval, based on the time information,
   wherein a time interval of the second time interval is a time interval decreased from a time interval of the first time interval.

6. The electronic device of claim 4, wherein the at least one processor is further configured to:
   if the pinch gesture is a second pinch gesture which presses two points on the touch screen using two fingers of a user and moves the two fingers in inward directions, classify the stored plurality of images according to the second time interval, based on the time information,
   wherein a time interval of the second time interval is a time interval increased from a time interval of the first time interval.

7. The electronic device of claim 1, wherein each of the plurality of images comprises at least one of a text, an audio, an image, an animation, or a video stored in the memory.

8. The electronic device of claim 1, wherein the at least one processor is further configured to:
   control to display, on a first area of the touch screen, at least one time item corresponding to the first time interval or the second time interval, and
   control to display, on a second area adjacent to the first area of the touch screen, the one or more first thumbnail images or the one or more second thumbnail images.

9. The electronic device of claim 1, wherein the at least one processor is further configured to:
   identify whether a swipe gesture is received through the touch screen, and
   in response to receiving the swipe gesture through the touch screen, control to move according a direction of the swipe gesture, on the touch screen, at least one time item corresponding to the first time interval or the second time interval.

10. The electronic device of claim 1, wherein the at least one processor is further configured to:
    identify whether a swipe gesture is received through the touch screen, and
    in response to receiving the swipe gesture through the touch screen, control to move according a direction of the swipe gesture, on the touch screen, the plurality of images classified according to the first time interval or the second time interval.

11. The electronic device of claim 1, wherein the at least one processor is further configured to:
identify whether an input corresponding to a selection of a specific image from among the plurality of images is received through the touch screen, and
in response to receiving the input corresponding to the selection of the specific image through the touch screen, control to display, on the touch screen, only the selected specific image of the plurality of images classified according to the first time interval or the second time interval.

12. The electronic device of claim 1, wherein the at least one processor is further configured to:
receive a user input as a filtering condition for filtering the classified plurality of images, and
in response to receiving the user input as the filtering condition, display one or more images of the classified plurality of images based on satisfying the filtering condition.

13. The electronic device of claim 12, wherein the filtering condition includes at least one of a predetermined period, a predetermined season, a predetermined weather, a predetermined location, a predetermined device, a predetermined person, or a type of image.

14. The electronic device of claim 13, wherein the at least one processor is further configured to:
when the filtering condition includes the predetermined location, display the one or more images based on a stored location associated with the one or more images in case of the stored location satisfying the predetermined location as the filtering condition.

15. A method for displaying a plurality of images in an electronic device, the method comprising:
receiving a request for displaying the plurality of images stored in a memory;
in response to receiving the request for displaying the plurality of images, displaying, on a touch screen, a first time item corresponding to a first time interval and one or more first thumbnail images that correspond to one or more images corresponding to the first time item respectively, wherein the plurality of images are classified according to the first time interval based on time information stored in the memory, and the one or more first thumbnail images are of a predetermined first size;
identifying that a user input for a change of a time interval is received through the touch screen; and
in response to receiving the user input for the change of the time interval, displaying, on the touch screen, a second time item corresponding to a second time interval and one or more second thumbnail images that correspond to one or more images corresponding to the second time item respectively, wherein the plurality of images are classified according to the second time interval based on the time information, and the one or more second thumbnail images are of a predetermined second size different from the predetermined first size.

16. The method of claim 15, wherein the first time interval or the second time interval comprises a range based on at least one of a day, a month, or a year.

17. The method of claim 15, wherein the user input for the change of the time interval comprises a press action input.

18. The method of claim 15, wherein the user input for the change of the time interval comprises a pinch gesture through the touch screen.

19. The method of claim 18, further comprising:
if the pinch gesture is a first pinch gesture which presses two points on the touch screen using two fingers of a user and moves the two fingers in outward directions, classifying the stored plurality of images according to the second time interval, based on the time information,
wherein a time interval of the second time interval is a time interval decreased from a time interval of the first time interval.

20. The method of claim 18, further comprising:
if the pinch gesture is a second pinch gesture which presses two points on the touch screen using two fingers of a user and moves the two fingers in inward directions, classifying the stored plurality of images according to the second time interval, based on the time information,
wherein a time interval of the second time interval is a time interval increased from a time interval of the first time interval.

21. The method of claim 15, wherein each of the plurality of images comprises at least one of a text, an audio, an image, an animation, or a video stored in the memory.

22. The method of claim 15, further comprising:
displaying, on a first area of the touch screen, at least one time item corresponding to the first time interval or the second time interval, and
displaying, on a second area adjacent to the first area of the touch screen, the one or more first thumbnail images or the one or more second thumbnail images.

23. The method of claim 15, further comprising:
identifying whether a swipe gesture is received through the touch screen, and
in response to receiving the swipe gesture through the touch screen, moving according a direction of the swipe gesture, on the touch screen, at least one time item corresponding to the first time interval or the second time interval.

24. The method of claim 15, further comprising:
identifying whether a swipe gesture is received through the touch screen, and
in response to receiving the swipe gesture through the touch screen, moving according a direction of the swipe gesture, on the touch screen, the plurality of images classified according to the first time interval or the second time interval.

25. The method of claim 15, further comprising:
identifying whether an input corresponding to a selection of a specific image from among the plurality of images is received through the touch screen, and
in response to receiving the input corresponding to the selection of the specific image through the touch screen, displaying, on the touch screen, only the selected specific image of the plurality of images classified according to the first time interval or the second time interval.

26. The method of claim 15, further comprising:
receiving a user input specifying a filtering condition for filtering the classified plurality of images, and
in response to receiving the user input specifying the filtering condition, displaying one or more images of the classified plurality of images based on satisfying the filtering condition.

27. The method of claim 26, wherein the filtering condition includes at least one of a predetermined period, a predetermined season, a predetermined weather, a predetermined location, a predetermined device, a predetermined person, or a type of image.

28. The method of claim 27, further comprising:
when the filtering condition includes the predetermined location, display the one or more images based on a stored location associated with the one or more images in case of the stored location satisfying the predetermined location as the filtering condition.

29. An electronic device for displaying a plurality of images, the electronic device comprising:
- a touch screen;
- a memory; and
- at least one processor configured to:
  - in response to receiving a request for displaying a plurality of images stored in the memory, control to display, on the touch screen, a first time item corresponding to a first time interval and one or more first thumbnail images that respectively correspond to one or more images corresponding to the first time item, wherein the plurality of images are classified according to the first time interval based on time information corresponding to each of the plurality of images, and the one or more first thumbnail images are of a predetermined first size,
  - identify that a pinch touch input for reducing a time interval is received through the touch screen, and
  - in response to receiving the pinch touch input for reducing the time interval, control to display, on the touch screen, a second time item corresponding to a second time interval which is less than the first time interval and one or more second thumbnail images that correspond to one or more images corresponding to the second time item respectively, wherein the plurality of images are classified according to the second time interval based on the time information, and the one or more second thumbnail images are of a predetermined second size larger than the predetermined first size.

30. The electronic device of claim 29, wherein the pinch touch input for reducing the time interval corresponds to a gesture which presses two points on the touch screen using two fingers of a user and moves the two fingers in outward directions.

* * * * *